Figure 10:
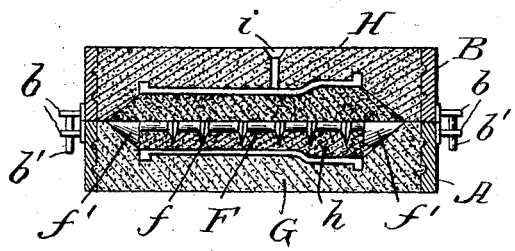

No. 737,854. PATENTED SEPT. 1, 1903.
J. G. MORRISON.
APPARATUS FOR MOLDING HOLLOW ARTICLES.
APPLICATION FILED DEC. 30, 1902.
NO MODEL. 3 SHEETS—SHEET 1.
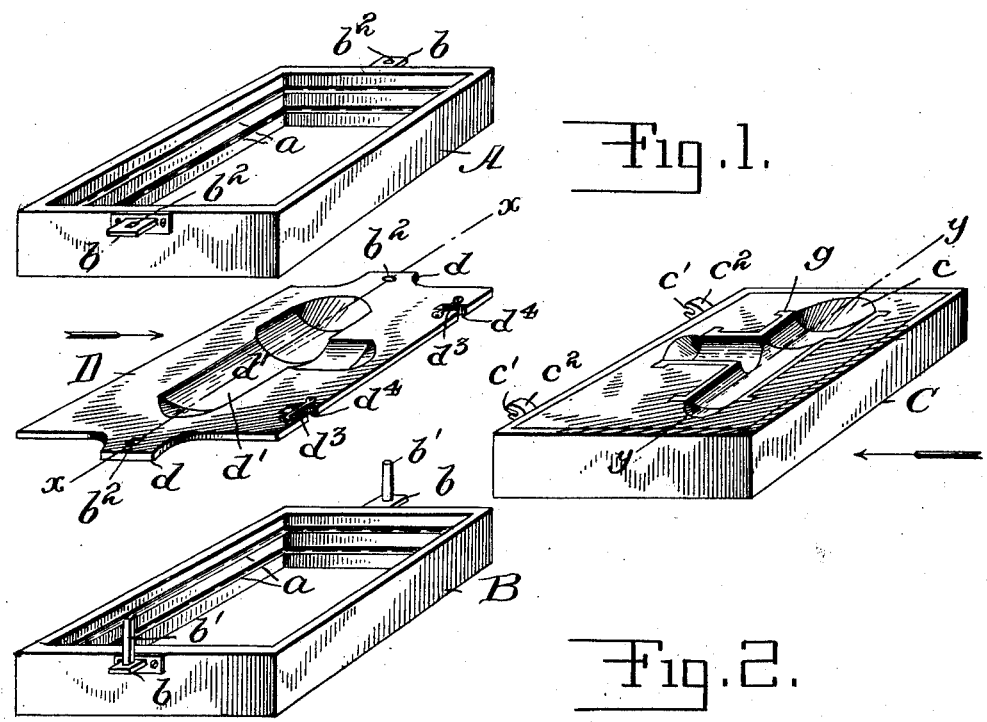
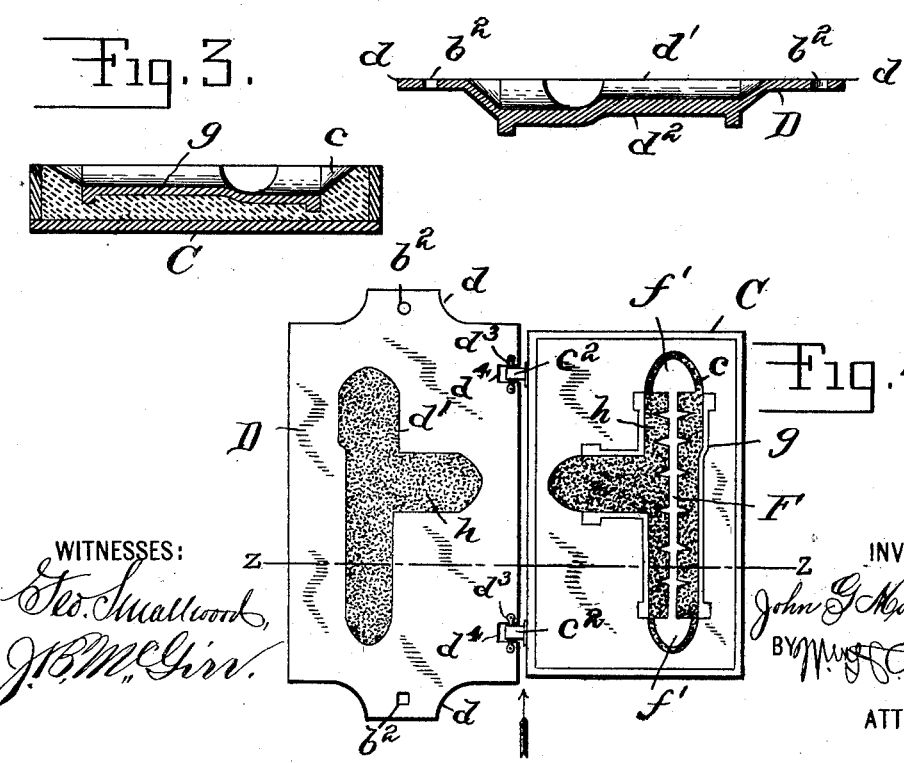
WITNESSES:
INVENTOR
John G. Morrison.
BY
ATTORNEY No. 737,854. PATENTED SEPT. 1, 1903.
J. G. MORRISON.
APPARATUS FOR MOLDING HOLLOW ARTICLES.
APPLICATION FILED DEC. 30, 1902.
NO MODEL. 3 SHEETS—SHEET 2.
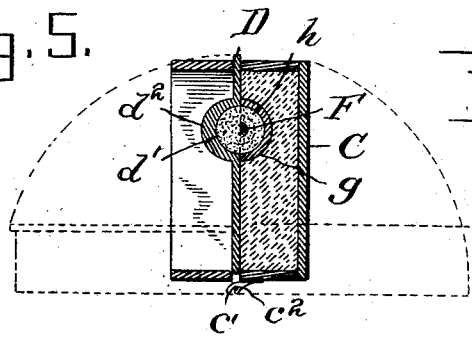
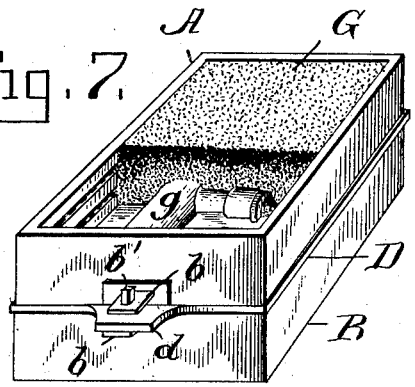
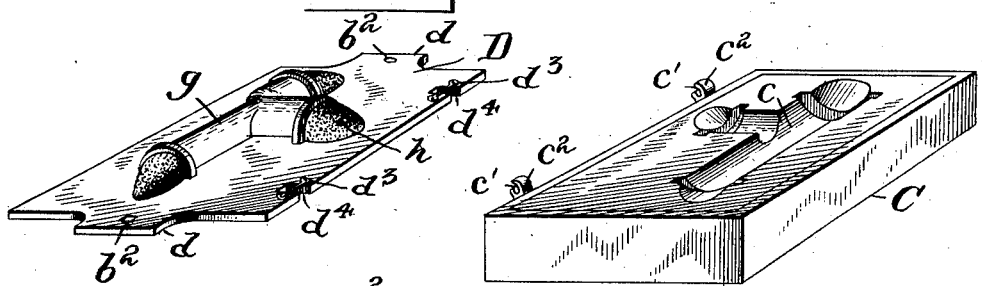
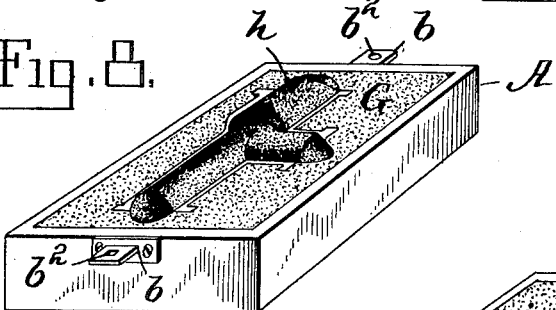
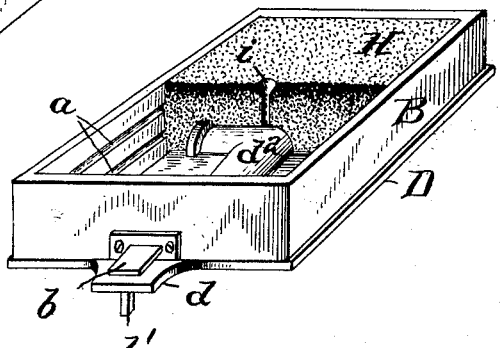
WITNESSES:
Geo. Smallwood
J. B. McGim.
INVENTOR
John G. Morrison.
BY
ATTORNEY No. 737,854. PATENTED SEPT. 1, 1903.
J. G. MORRISON.
APPARATUS FOR MOLDING HOLLOW ARTICLES.
APPLICATION FILED DEC. 30, 1902.
NO MODEL. 3 SHEETS—SHEET 3.

WITNESSES:
Geo. Smallwood,
J. B. McGinn.

INVENTOR
John G. Morrison.
BY
ATTORNEY

THE NORRIS PETERS CO., PHOTO-LITHO., WASHINGTON, D. C.

No. 737,854. Patented September 1, 1903.

UNITED STATES PATENT OFFICE.

JOHN G. MORRISON, OF NEW YORK, N. Y.

APPARATUS FOR MOLDING HOLLOW ARTICLES.

SPECIFICATION forming part of Letters Patent No. 737,854, dated September 1, 1903.

Application filed December 30, 1902. Serial No. 137,196. (No model.)

*To all whom it may concern:*

Be it known that I, JOHN G. MORRISON, a citizen of the United States, and a resident of the borough of Brooklyn, in the city of New York, county of Kings, and State of New York, have invented a certain new and useful Improvement in Apparatus for Use in Molding Hollow Articles, of which the following is a specification.

In the molding of hollow articles as heretofore practiced two different methods have been pursued, in one of which the core that forms and determines the interior shape and configuration of the article is constructed of a hard and unyielding composition, usually composed of molder's sand, flour, and molasses or beer, which after having been cast or otherwise fashioned in the required shape is baked until it becomes a rigid mass and is usually known as a "dry-sand" core, while in the other of which the core is formed from the usual molder's sand at the time of molding the article and is known to the art as a "green-sand" core. When the first of these methods is employed, the pattern of the article to be cast is preferably made solid, with properly-shaped projections at its ends or other appropriate places for forming recesses in the sand for the reception of the ends of the core or other projections thereon after the molding operation has been completed, and is divided axially or along some other appropriate line, whereby the two parts may be separated when desired or brought together, being detachably held in place when so united by appropriate dowels in one part entering corresponding holes in the other. As thus constructed the molding of the article is effected by the use of a two-part flask, one of which parts is usually called a "nowel" and the other of which is usually designated a "cope," with a smooth plain board of the length and breadth of the flask. With the apparatus and pattern constructed as thus described the molding of the article is effected by separating the parts of the pattern and placing the flat portion of one of the parts upon the board, after which the nowel is placed upon the board over the pattern and the part of the flask thus disposed "rammed up," as it is usually called, with sand, by which is meant filling this portion of the flask with sand and firmly compacting it therein. This operation having been completed, the nowel is raised from the board and turned upside down, the other portion of the pattern then placed upon the part already contained therein, the surface of the sand thus turned upward next sprinkled with dry or what is known as "separating" sand, and the cope then placed in proper position upon the nowel, following which this part of the flask is then rammed up with sand or filled with the same and properly compacted, as with the sand of the nowel. This ramming up of the two parts of the flask having been thus completed, the cope is removed from the nowel and turned upon its back, after which the pattern is lifted from the sand and the previously-constructed core placed in proper position in the matrix of the article thus formed, with its projecting ends resting in the recesses that have been formed therein by the projections on the pattern. The cope and nowel are then brought together and are ready for receiving the molten iron or other material, which is poured through a suitable hole, called the "sprue-hole," leading from the exterior of the cope to the matrix. When, on the other hand, the other of these methods is adopted, a two-part flask, composed of a nowel and a cope and two smooth plain boards of approximately the length and breadth of the flask and called, respectively, a "mold-board" and a "flask-board," is employed, and the pattern, which is likewise separable on a line passing through its center or other appropriate point, is constructed hollow and is usually known to the art as a "shell-pattern." With the several parts constructed as thus described when the molding of the article is to be effected the parts of the pattern are separated and the interior of one of these parts rammed up with sand to form one part of the core. The portion of the pattern thus filled with sand is then placed upon the mold-board with its concave face downward after the sand compacted in its interior has been smoothed off, the nowel then placed over it on the mold-board and rammed up with sand, forming thereby a matrix of one half of the exterior of the article to be produced. The flask-board is then placed over the top of the nowel, the nowel raised from the mold-board and turned upside down, in which position it is allowed to rest upon the flask-board, with the portion of the pattern over which it was placed and its contained portion of the core retained therein. To the portion of the pattern thus contained in the sand of the nowel is then applied the remaining portion of the pattern and its interior rammed up with sand driven in at its ends, forming with that contained in the portion of the pattern in the nowel the completed core. The core having been thus completed, the surface of the sand in the upturned nowel is then covered with dry or separating sand, the cope applied to the nowel and filled and rammed up with sand, and a matrix of the exterior of the other half of the article to be produced thereby completed. The cope is then removed from the nowel and turned upside down and allowed to rest upon the flask-board. The portion of the pattern projecting upward from the nowel is then removed from the core and the core itself removed from the portion of the pattern remaining in the sand of the nowel. This having been accomplished, the portion of the pattern remaining in the sand of the nowel is then removed, the core returned to the matrix in the nowel, with its ends resting in the recesses formed in the sand to receive them, and the cope placed in proper position upon the nowel, when the mold for the article is completed and ready to receive the molten metal, which may be supplied thereto through a suitable sprue-hole prepared in the sand of the cope to receive it. These two methods of molding while effective to a limited extent in the production of certain articles are found objectionable when employed in the production of others, principally because of the cost of the core in the one and the difficulty of handling the core in the other, which in consequence of its fragile character is extremely likely to fall to pieces when disturbed.

It is to the latter of these methods of procedure that my invention more particularly relates; and it has for its object to provide means whereby the objections above pointed out may be obviated and the molding of hollow articles with green-sand cores not only simplified and facilitated, but the cost thereof greatly cheapened.

To these ends the invention consists in the peculiarly-constructed apparatus by means of which the molding is effected, all as will hereinafter more fully appear.

Figure 11:
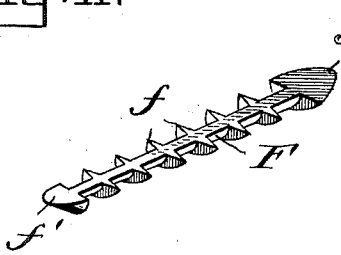
Figure 12:
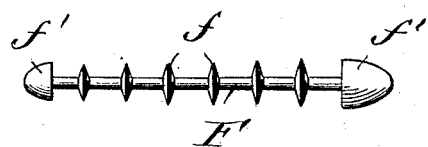
Figure 13:
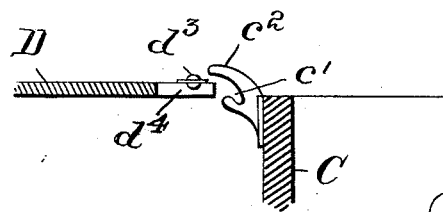

Referring to the accompanying drawings, which form a part of this specification, Figure 1 is a perspective view of my invention, showing the several parts thereof separated the one from the other for purposes of illustration; Fig. 2, a longitudinal sectional view of the match-plate, taken in the plane $x\ x$ of Fig. 1; Fig. 3, a similar longitudinal sectional view of the mold-board, taken in the plane $y\ y$ of Fig. 1; Fig. 4, a plan view of the match-plate and mold-board, showing the manner of forming the core of the article to be molded; Fig. 5, a transverse section of the match-plate, the mold-board, and the nowel superposed the one upon the other and showing the manner of bringing the two parts of the core together after having been molded and transferring the portion of the pattern from the mold-board to the match-plate; Fig. 6, a perspective view of the match-plate and mold-board, showing the mold-board swung back from off the match-plate and the core and the detachable portion of the pattern resting in and upon the match-plate; Fig. 7, a perspective view of the nowel, the match-plate, and cope deposited the one upon the other with the nowel rammed up or compacted with sand and a portion of the sand removed for purposes of illustration, a portion of the pattern of the article being molded being also shown; Fig. 8, a perspective view of the nowel removed from the match-board and cope and turned bottom side up, showing a matrix of one half of the article to be cast with the core resting therein; Fig. 9, a perspective view of the match-plate and cope turned upside down from the position which they occupy in Figs. 1 and 7, with the cope resting upon the match-plate and rammed up or compacted with sand and a portion of the sand removed for purposes of illustration, showing also a portion of the raised part of the match-plate that forms a portion of the matrix of the article to be produced; Fig. 10, a longitudinal vertical section of the nowel and cope with the cope superposed upon the nowel, taken axially through the matrix of the article to be cast, and showing the core in longitudinal section; Fig. 11, a perspective view of the arbor upon which the sand is compacted to form the core; Fig. 12, a plan view thereof; Fig. 13, a detail sectional view of a portion of the match-plate and the mold-board, showing also a form of connection by which the match-plate and mold-board may be detachably pivoted together; and Fig. 14, a side elevation of one of the forms of hollow articles that may be produced by the use of the invention, the same being a length of tubing with a branch projecting therefrom and known to the art as a "T" branch.

In all the figures like letters of reference are employed to designate corresponding parts.

A and B indicate the parts of a two-part flask, respectively, of which the part A is usually designated a "nowel" and the part B a "cope." These two parts are preferably constructed of rectangular form, with open tops and bottoms, and are or may be severally provided in their respective interiors with longitudinally-disposed grooves $a$, whereby to aid in holding the sand in those parts when it has been rammed up or compacted in them.

C indicates a mold-board, which, as shown in the drawings, is constructed of the proper shape and dimensions to adapt it to the flasks and other parts of the apparatus in connection with which it is to be employed and is provided in its face with a matrix $c$, corresponding in size and shape to the exterior of one half of the article that is to be molded and to the exterior of one half of the core that is to form or fashion the interior of such article and the ends thereof.

D indicates a match-plate which coöperates with the mold-board in forming the core and with the nowel and cope in forming the exterior of the article to be molded. This match-plate is preferably constructed slightly larger than the flask and mold-board in connection with which it is to be employed, with the middle portion $d$ of its ends extended somewhat to form handholds whereby it may be readily handled when in use, and instead of being made of some considerable thickness, as is the case with the mold-board, it is, as its name implies, constructed in plate form of relatively small thickness with the form of the other half of the article to be molded embossed therein, whereby a matrix for the exterior of half of the core and half of the ends thereof appear depressed or in intaglio on one side, as shown at $d'$, and a pattern of the exterior of half of the article to be molded raised or in rilievo on the other, as shown at $d^2$. As thus constructed the embossed portion of this match-plate is so disposed with respect to the matrix $c$ in the mold-board C that when the match-plate and the mold-board are swung upwardly together on the edge of the former and the side of the latter this embossed portion will be brought directly opposite the matrix $c$ with the inner edges of its depressed portion $d'$ in coincident relationship to the interior edges of the pattern in the matrix $c$ and the outer edges of its raised portion $d^2$ in coincident relationship to the outer edges of such pattern, as shown in Fig. 5.

To insure of the bringing of this embossed portion of the match-plate D into the proper relationship to the matrix in the mold-board C when the match-plate and mold-board are swung together, while yet permitting of the separation of the match-plate and the mold-board when required, various means may be adopted. I prefer, however, to employ for this purpose open pivoted joints, which are disposed near the opposite ends of the match-plate and mold-board and consist of open bearings $c'$ and pivots $d^3$. Of these the open bearings $c'$ are formed in the outer ends of stands $c^2$, which secured to extend outward from the side of the mold-board C near its upper edge, while the pivots $d^3$ are formed in or secured across suitable recesses $d^4$, formed in the edge of the match-plate D, as shown in Fig. 1. With the joints constructed as thus described the uniting of the match-plate and the mold-board and the swinging of the two upwardly together is effected when required by moving the mold-board toward the match-plate until the open bearings $c'$ are passed over their respective pivots $d^3$ and then swinging the two upwardly together on the bearings and pivots, while the separation of the match-plate from the mold-board when thus swung together will be accomplished by swinging the two downward away from each other and drawing the mold-board back away from the match-plate until the open bearings $c'$ thereon are removed from engagement with the pivots $d^3$.

With the parts constructed as above described are preferably employed means whereby the convenient handling of the nowel and cope may be effected and the proper location of the parts of the matrix or mold in those devices to insure of the perfect registry of these parts when such nowel and cope are brought together not only accomplished, but their retention in that relationship secured during the casting operation. Of these the means whereby the handling of the nowel and cope may be effected consists of the handholds $b$, which, constructed with suitable bases by which they may be secured in place and with outwardly-extending plates for engagement by the hands of the workman, are secured to the opposite ends of those parts near their upper or meeting edges, while the means for properly locating the parts of the matrix or mold of the article in the nowel and cope and retaining them in proper relationship when brought together consists of the upwardly-extending studs $b'$ and the correspondingly-shaped holes $b^2$, with which these studs coöperate. In some instances these studs may be located at the front and back of the cope, in which cases the holes which correspond with them will be formed through the front and rear edges of the match-plate and through suitable brackets secured to the front and back of the nowel. I prefer, however, to secure them to the upper surface of the handholds $b$ on the opposite ends of the cope and to form the corresponding holes through the upwardly-extending middle end portions $d$ of the match-plate and through the outwardly-extending plates of the handholds $b$ of the nowel and to construct the studs and coöperating holes at the opposite ends of the parts of a different cross-section—as, for instance, of a rectangular form at one end and of a circular contour at the other—whereby to prevent the joining of the portions of the matrix or mold of the article to be produced in reverse relationship when completed.

With the apparatus constructed as above set forth may be produced any of the various forms of hollow article that may be desired. In the drawings I have shown the apparatus as adapted to the production of short sections of pipe that are provided with a lateral branch extending outward from the side of each, as shown in Fig. 13, wherein E indicates the body of the pipe, and $e$ the lateral branch extending outward therefrom. This example, however, is merely illustrative, and any of the other forms of hollow article may be produced in place thereof by simply adapting the matrix in the moldboard and the embossed portion of the match-plate thereto and employing in connection with them a half-pattern of the appropriate design and configuration.

Figure 14:
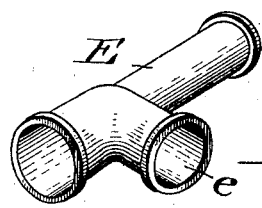

When the core that forms and determines the interior configuration of the article to be produced is not of too great a length or is of too delicate a character it may be composed wholly of green sand without any other support. On the other hand, when constructed of some considerable length or it is of such a character that it cannot support itself without assistance a metal arbor is usually employed as a support for it, and in Figs. 11 and 12 I have shown the construction of arbor that is usually employed for the purpose when the form of article illustrated in Fig. 14 is to be produced, the same being composed of the body F, with a number of projections $f$ extending outward therefrom along its length and with suitable enlargements $f'$ at its ends whereby to support it in the matrix $c$ of the mold-board, during the formation of the core and afterward to support the core itself when completed in the matrix or mold of the article to be produced in the nowel or cope, as shown in Fig. 10.

With the parts constructed as above explained the operation of the apparatus in the molding of a hollow article—as, for instance, an ordinary T branch—is as follows:

The half-pattern $g$ of the article to be produced is first deposited in the matrix $c$ in the mold-board C, and the arbor F is then placed in the pattern with its ends $f'$ resting in the concave recesses at the end of such matrix. The matrix $d'$ in the match-plate D and the interior of the half-pattern $g$ around the arbor F are then rammed up with sand until they are completely filled. The surfaces of the sand thus compacted in them is then smoothed off with a straight-edge until they are flush with the respective surfaces of the match-plate and mold-board, as shown in Fig. 4, and the two halves of the core $h$ thereby completed. The mold-board C is then moved toward the match-plate D until the open bearings $c'$ are passed over their respective pivots $d^3$ on the match-plate or to the position shown in Fig. 4 and the mold-board and match-plate, with the cope B, swung upward from the position shown by dotted lines in Fig. 5 to that shown by the full lines therein. In this position the mold-board and match-plate are brought together and the parts of the core in the matrix $d'$ and in the interior of the pattern $g$ united. The cope, match-plate, and mold-board are then turned over upon the cope and the mold-board then swung back from the match-plate and detached therefrom, leaving the entire core $h$ in the recess $d'$ in the match-plate with the half-pattern resting thereon, as shown in Fig. 6. The nowel A is next placed over the match-plate and over the core $h$ and half-pattern $g$ and rammed up with sand G, as shown in Fig. 7. The nowel is then removed from the match-plate D and the half-pattern $g$ removed from the core $h$ and returned to the matrix $c$ in the mold-board, leaving the core in the matrix $d'$ of the match-plate. The nowel A is then placed again over the match-plate D and with the match-plate and the cope are turned upside down together and rested upon the bottom of the nowel, the result of which operation is to transfer the core $h$ from the matrix $d'$ in the match-plate D to the portion of the matrix of the article that was formed of the sand in the nowel A at the time it was rammed up, as shown in Fig. 8. The cope B and match-plate D are then removed from the nowel A, and after having been deposited upon a suitable support and the sprue-pattern $i$ deposited in proper position upon the match-plate the cope is then rammed up with sand H, as shown in Fig. 9. The sprue-pattern is then withdrawn from the sand and the cope B removed from the match-plate D and placed in proper position upon the nowel A with the studs $b'$ on the former entering the appropriate holes $b^2$ in the latter, when the molding of the article is completed and the mold ready for the casting operation, as shown in Fig. 10.

It will thus be seen that with the apparatus described I not only obviate the handling of the core, and thereby the danger of destroying it, but so simplify the casting of hollow articles that a cheaper grade of help may be employed in the molding operation with the consequent effect of greatly cheapening the cost of manufacture.

It will of course be understood that in conducting the several steps in the molding operation above specified dry or separating sand may be applied to the surfaces where required and the different parts rapped when found necessary to separate them from the sand, as is common to the molding operations as ordinarily practiced.

While in the foregoing I have described the form of apparatus which I prefer to use in practice, it is to be understood that I do not limit myself strictly thereto, as it is obvious that modifications may be made in various parts of the same without departing from the spirit of my invention.

Having now described my invention and specified certain of the ways in which it is or may be carried into effect, I claim and desire to secure by Letters Patent of the United States—

1. The combination, with a match-plate provided with a matrix of one half of the core of the article to be produced, of a mold-board provided with a coöperating matrix of one half the exterior of such article, substantially as described.

2. The combination, with a match-plate provided with a matrix of one half of the core of the article to be produced, and a mold-board provided with a coöperating matrix of one half of the exterior of such article, of means for detachably pivoting those parts together whereby they may be swung upward toward, and downward away from each other, substantially as described.

3. An apparatus for molding hollow articles, consisting of a nowel, a cope, a match-plate, and a mold-board, the match-plate being provided in one of its faces with a matrix of one half of the core of the article to be produced, and on its other with a raised pattern of one half of the exterior of such article, and the mold-board being similarly provided with a matrix of the exterior of the other half of said article, substantially as described.

4. The combination, with the match-plate provided with a matrix of one half of the core of the article to be produced, and with pivots on one of its edges, of a mold-board provided with a corresponding matrix of one half of the exterior of such article and with open bearings extending outward from one of its sides, for coöperation with the pivots on the match-plate, substantially as described.

In testimony whereof I have hereunto set my hand, in the presence of two witnesses, this 27th day of December, 1902.

JOHN G. MORRISON.

Witnesses:
CHAS. E. POENSGEN,
R. F. SWEENY.